United States Patent
Zhang et al.

(10) Patent No.: US 12,469,268 B2
(45) Date of Patent: Nov. 11, 2025

(54) METHOD, DEVICE AND COMPUTER STORAGE MEDIUM FOR DATA ANALYSIS

(71) Applicant: NEC CORPORATION, Tokyo (JP)

(72) Inventors: Ni Zhang, Beijing (CN); Xiaoyi Chen, Beijing (CN)

(73) Assignee: NEC CORPORATION, Tokyo (JP)

( * ) Notice: Subject to any disclaimer, the term of this patent is extended or adjusted under 35 U.S.C. 154(b) by 687 days.

(21) Appl. No.: 17/433,941

(22) PCT Filed: Jan. 21, 2020

(86) PCT No.: PCT/CN2020/073628
§ 371 (c)(1),
(2) Date: Aug. 25, 2021

(87) PCT Pub. No.: WO2020/173270
PCT Pub. Date: Sep. 3, 2020

(65) Prior Publication Data
US 2022/0148290 A1    May 12, 2022

(30) Foreign Application Priority Data
Feb. 25, 2019    (CN) .......................... 201910138788.5

(51) Int. Cl.
*G06V 10/82*    (2022.01)
*G06V 10/764*   (2022.01)
(Continued)

(52) U.S. Cl.
CPC .......... *G06V 10/82* (2022.01); *G06V 10/764* (2022.01); *G06V 10/774* (2022.01); *G06V 10/84* (2022.01)

(58) Field of Classification Search
CPC ...... G06V 10/82; G06V 10/84; G06V 10/774; G06V 10/764
(Continued)

(56) References Cited

U.S. PATENT DOCUMENTS

| | | | |
|---|---|---|---|
| 9,275,347 B1 * | 3/2016 | Harada | .................... G06N 3/08 |
| 2017/0140278 A1 | 5/2017 | Gupta et al. | |
| 2018/0240031 A1 | 8/2018 | Huszar et al. | |

FOREIGN PATENT DOCUMENTS

| | | |
|---|---|---|
| CN | 105654174 A | 6/2016 |
| CN | 107688876 A | 2/2018 |

(Continued)

OTHER PUBLICATIONS

Moujahid ("A practical Introduction to Deep Learning with Caffe and Python", 2016, https://adilmoujahid.com/posts/2016/06/introduction-deep-learning-python-caffe/) (Year: 2016).*

(Continued)

*Primary Examiner* — Mark Roz
(74) *Attorney, Agent, or Firm* — Sughrue Mion, PLLC

(57) ABSTRACT

Embodiments of the present disclosure relate to a method, a device and a computer storage medium for data analysis. The method comprises: obtaining a prediction model, a processing layer of the prediction model comprising a plurality of processing units, parameters of each of the a plurality of processing units satisfying an objective parameter distribution, an output of the prediction model being determined based on a plurality of groups of parameters determined from the parameter distribution; and applying model input data to the prediction model, so as to obtain a prediction for the model input data. In this way, a more accurate prediction result may be obtained.

14 Claims, 5 Drawing Sheets

(51) Int. Cl.
*G06V 10/774* (2022.01)
*G06V 10/84* (2022.01)

(58) Field of Classification Search
USPC .......................................................... 382/156
See application file for complete search history.

(56) References Cited

FOREIGN PATENT DOCUMENTS

| | | |
|---|---|---|
| CN | 107832298 A | 3/2018 |
| CN | 108944947 A | 12/2018 |
| CN | 108985313 A | 12/2018 |
| JP | 2006-163465 A | 6/2006 |

OTHER PUBLICATIONS

Mazur ("A Step by Step Backpropagation Example" 2015 https://mattmazur.com/2015/03/17/a-step-by-step-backpropagation-example/) (Year: 2015).*

Merriam Webster Dictionary (excerpt) (Year: 2024).*
Zhou, Shengqiang et al., "Research on Early Warning of Financial Risks Based on Bayesian Neural Neural Network", Huabei Finance, No. 09, Sep. 25, 2018, ISSN: 1007-4392, pp. 4-15.
International Search Report for PCT/CN2020/073628 dated Apr. 10, 2020.
Written Opinion for PCT/CN2020/073628 dated Apr. 10, 2020.
Office Action issued Jan. 30, 2024 in Japanese Application No. 2021-549650.
Yarin Gal, et al. "Deep Bayesian Active Learning with Image Data", arXiv:1703.02910v1 [cs.LG], Mar. 8, 2017 (10 pages total).
Jiang Zhen-yu et al. "Uncertainty analysis approach based on predictive model in virtual experiment", Journal of Engineering Design, Feb. 2008, vol. 15, No. 1, (5 pages).
Hu Wenliang, et al., "Prediction Modeling based on Bayes Support Vector machine", Journal of Beijing University of Aeronautics and Astronautics, Apr. 2010, vol. 36, No. 4, pp. 486-489 (4 pages).
Chinese Office Action dated Feb. 6, 2025 in Application No. 201910138788.5.

* cited by examiner

METHOD, DEVICE AND COMPUTER STORAGE MEDIUM FOR DATA ANALYSIS

CROSS REFERENCE TO RELATED APPLICATIONS

This application is a National Stage of International Application No. PCT/CN2020/073628 filed Jan. 21, 2020, claiming priority based on Chinese Patent Application No. 201910138788.5 filed Feb. 25, 2019.

FIELD

Embodiments of the present disclosure relate to the technical field of artificial intelligence, and more specifically, to a method, a device and a computer storage medium for data analysis.

BACKGROUND

With the constant development of the computer technology, more and more prediction models such as deep neural networks are applied to tasks such image recognition, speech recognition, object detection and the like. During prediction, a number of samples for training prediction models is limited. Therefore, once actually processed model input data differs from the training samples, the prediction models might make overconfident incorrect determinations. Therefore, prediction models cannot accurately determine whether the prediction made is accurate, which is undesirable.

SUMMARY

Embodiments of the present disclosure provide a solution for data analysis.

According to a first aspect of the present disclosure, a method is proposed for data analysis. The method comprises: obtaining a prediction model, a processing layer of the prediction model comprising a plurality of processing units, parameters of each of the a plurality of processing units satisfying an objective parameter distribution, an output of the prediction model being determined based on a plurality of groups of parameters determined from the parameter distribution; and applying model input data to the prediction model, so as to obtain a prediction for the model input data.

According to a second aspect of the present disclosure, a device is proposed for data analysis. The device comprises: at least one processing unit; at least one memory, coupled to the at least one processing unit and storing instructions executed by the at least one processing unit, the instructions, when executed by the at least one processing unit, causing the device to perform acts comprising: obtaining a prediction model, a processing layer of the prediction model comprising a plurality of processing units, parameters of each of the a plurality of processing units satisfying an objective parameter distribution, an output of the prediction model being determined based on a plurality of groups of parameters determined from the parameter distribution; and applying model input data to the prediction model, so as to obtain a prediction for the model input data.

According to a third aspect of the present disclosure, a computer-readable storage medium is provided. The computer-readable storage medium comprises computer-readable program instructions stored thereon for performing a method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example implementations of the present disclosure with reference to the accompanying drawings, the above and other objects, features and advantages of the present disclosure will become more apparent, wherein the same reference numerals typically represent the same components in the example embodiments of the present disclosure.

DETAILED DESCRIPTION OF IMPLEMENTATIONS

Some preferable embodiments will be described in more detail with reference to the accompanying drawings, in which the preferable embodiments of the present disclosure have been illustrated. However, the present disclosure can be implemented in various manners, and thus should not be construed to be limited to embodiments disclosed herein. On the contrary, those embodiments are provided for the thorough and complete understanding of the present disclosure, and completely conveying the scope of the present disclosure to those skilled in the art.

The term "comprise" and its variants used here are to be read as open terms that mean "include, but is not limited to." Unless otherwise specified, the term "or" is to be read as "and/or." The term "based on" is to be read as "based at least in part on". The terms "one example implementation" and "one implementation" are to be read as "at least one implementation." The term "another implementation" is to be read as "at least one other implementation." The terms "first," "second" and the like may refer to different or the same objects. Other definitions, explicit and implicit, might be included below.

As described above, with the constant development of the computer technology, more and more prediction models such as deep neural networks are applied to tasks such as image recognition, speech recognition, object detection and the like. People increasingly rely on the prediction results of model input data by the prediction models. Especially in key areas such as medical diagnosis, financial investment, business and public decision-making, the reliability and stability of prediction results are particularly important. Therefore, people pay closer attention to how to improve the accuracy of prediction models for the uncertainty measurement of prediction results.

According to embodiments of the present disclosure, a solution is provided for data analysis. In the solution, first, a prediction model may be obtained, wherein a processing layer of the prediction model comprises a plurality of processing units, parameters of each of the a plurality of processing units satisfying a target parameter distribution, an output of the prediction model being determined based on a plurality of groups of parameters determined from the parameter distribution. Subsequently, model input data may be applied to the prediction model so as to obtain a prediction for the model input data. In this way, since the prediction model only defines a parameter distribution in a single processing layer but fails to define specific values of parameters of various processing units in the processing layer, randomness is added to the prediction model, and such distribution parameters may more accurately reflect the uncertainty measurement of the predicted output.

Figure 1:
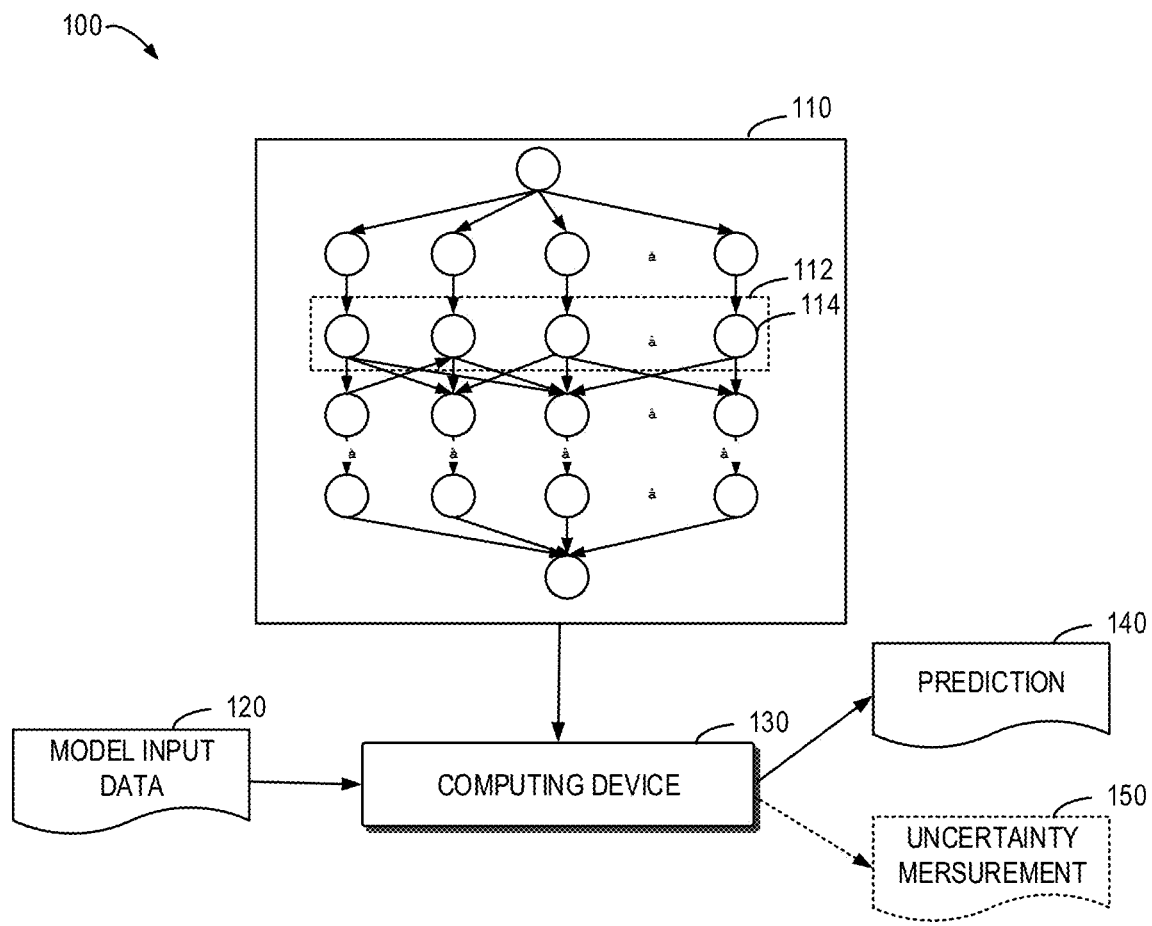
FIG. 1 shows a schematic view of an environment in which embodiments of the present disclosure may be implemented.

Embodiments of the present disclosure will be described in detail with reference to the drawings. FIG. 1 shows a schematic view of an example environment 100 in which a plurality of embodiments of the present disclosure can be implemented. As depicted, the example environment 100 comprises a computing device 130, which may be used to implement the determination of the uncertainty measurement of the prediction according to various implementations of the present disclosure. The computing device 130 may receive a prediction model 110 and model input data 120 so as to output a prediction 140 for the model input data 120. In some embodiments, the computing device 130 may further generate an uncertainty measurement 150 of the prediction 140.

The prediction model 110 can learn certain knowledge and abilities from existing data to process new data. The prediction model 110 may be designed to perform various tasks, such as image classification, object detection, speech recognition, machine translation, content filtering, etc. Examples of the prediction model 110 may comprise but are not limited to, various types of deep neural networks (DNNs), convolutional neural networks (CNNs), support vector machines (SVMs), decision trees, random forest models, etc. In implementations of the present disclosure, the prediction model may also be referred to as "machine learning model." The terms "prediction model," "neural network," "learning model," "learning network," "model" and "network" may be used interchangeably herein.

In FIG. 1, the prediction model 110 is shown as a deep neural network. The deep neural network has a layered architecture, wherein each processing layer (also referred to as a network layer) comprises one or more processing units (also referred to as processing nodes, neurons or filters) that process an input based on corresponding parameters. In the deep neural network, an output of a preceding layer is provided as an input for a following layer, where the first layer in the architecture receives a network input for processing while an output of the last layer is provided as a network output. As shown in FIG. 1, the prediction model 110 comprises a processing layer 112, which comprises one or more processing units 114. Parameters used by all processing units 114 of the prediction model 110 constitute a parameter set of the prediction model 110. Specific values of such a parameter set needs to be determined through a training process.

It should be understood that the architecture of the prediction model and the numbers of processing layers and processing units as shown in FIG. 1 are for illustration purposes, rather than limiting. In different applications, the prediction model, as needed, may be designed to have other appropriate architecture and/or an appropriate number of processing layers, each of which may have an appropriate number of processing units.

In some embodiments, the model input data 120 received by the computing device 130 is non-time series data such as images, medical data, business data and the like, wherein the prediction 140 may be a result based on data analysis. Specifically, the prediction model 110 may perform at least one of the following operations on the model input data 120: recognition, classification, pattern analysis, feature detection and extraction. In some embodiments, the prediction 140 may be a classification prediction made by the prediction model 110 for the model input data 120. For example, when the model input data 120 is an image, the prediction 140 may be a classification result of the image (e.g., an object included in the image is a cat or a dog). In some embodiments, the prediction 140 may also be a regression prediction made by the prediction model for the model input data 120. For example, when the model input data 120 is an image, the prediction 140 may be boundary data (e.g., boundary pixels of a cat included in the image) of a specific object in the image as output by the prediction model 110.

In some embodiments, the uncertainty measurement 150 may be used to reflect the certainty degree of the prediction 140 made by the prediction model 110. In some embodiments, Bayesian Active Learning by Disagreement (BALD) may be used as the uncertainty measurement 150 in the present disclosure. The process of the computing device 130 generating the prediction 140 and the uncertainty measurement 150 will be described in detail. In some embodiments, part of operations (e.g., recognition, analysis, decision making, etc.) for determining the prediction 140 may proceed after the uncertainty measurement 150 is determined.

Figure 2:
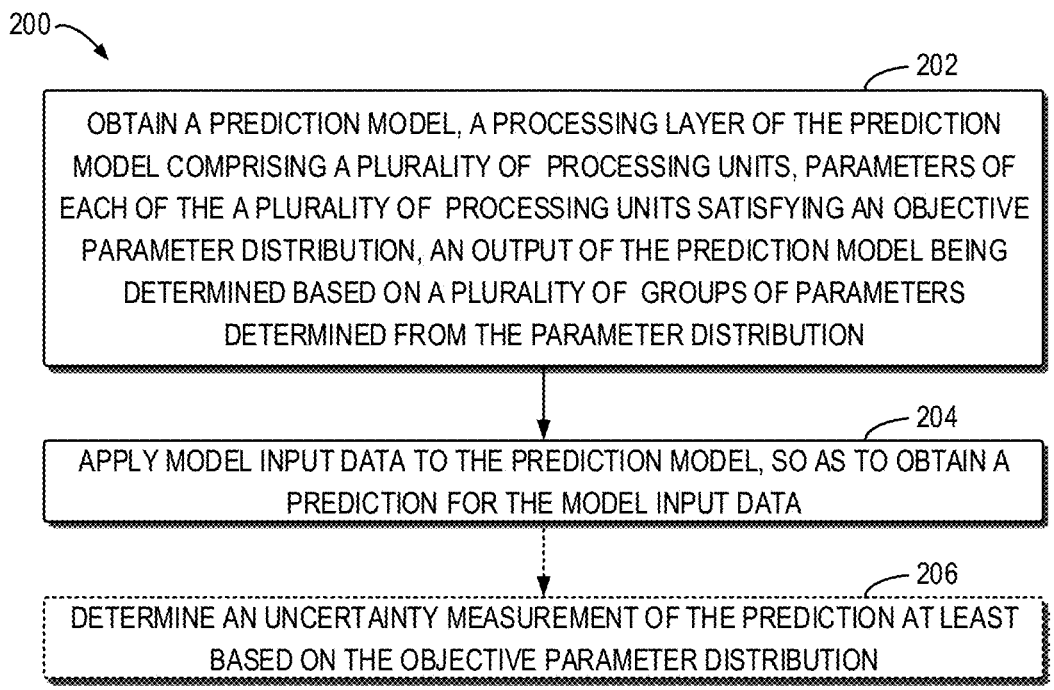
FIG. 2 shows a flowchart of the process of data analysis according to embodiments of the present disclosure.

A detailed description is presented below to the process of data analysis with reference to FIGS. 2 to 5. FIG. 2 shows a flowchart of a process 200 for determining an uncertainty measurement of a prediction according to some embodiments of the present disclosure. The process 200 may be implemented by the computing device 130 in FIG. 1. For the sake of discussion, the process 200 will be described in conjunction with FIG. 1.

At block 202, the computing device 130 obtains a prediction model 110, wherein a processing layer 112 of the prediction model 110 comprises a plurality of processing units 114, parameters of each of the a plurality of processing units 114 satisfying an object parameter distribution, an output of the prediction model 110 being determined based on a plurality of groups of parameters determined from the parameter distribution. In some embodiments, the object parameter distribution may indicate a value range of the parameter of the processing unit and a corresponding value probability, e.g., a standard normal distribution, etc. In some embodiments, as shown in FIG. 1, the prediction model 110 may be based on a deep neural network and more specifically, based on a convolutional neural network.

Figure 3:
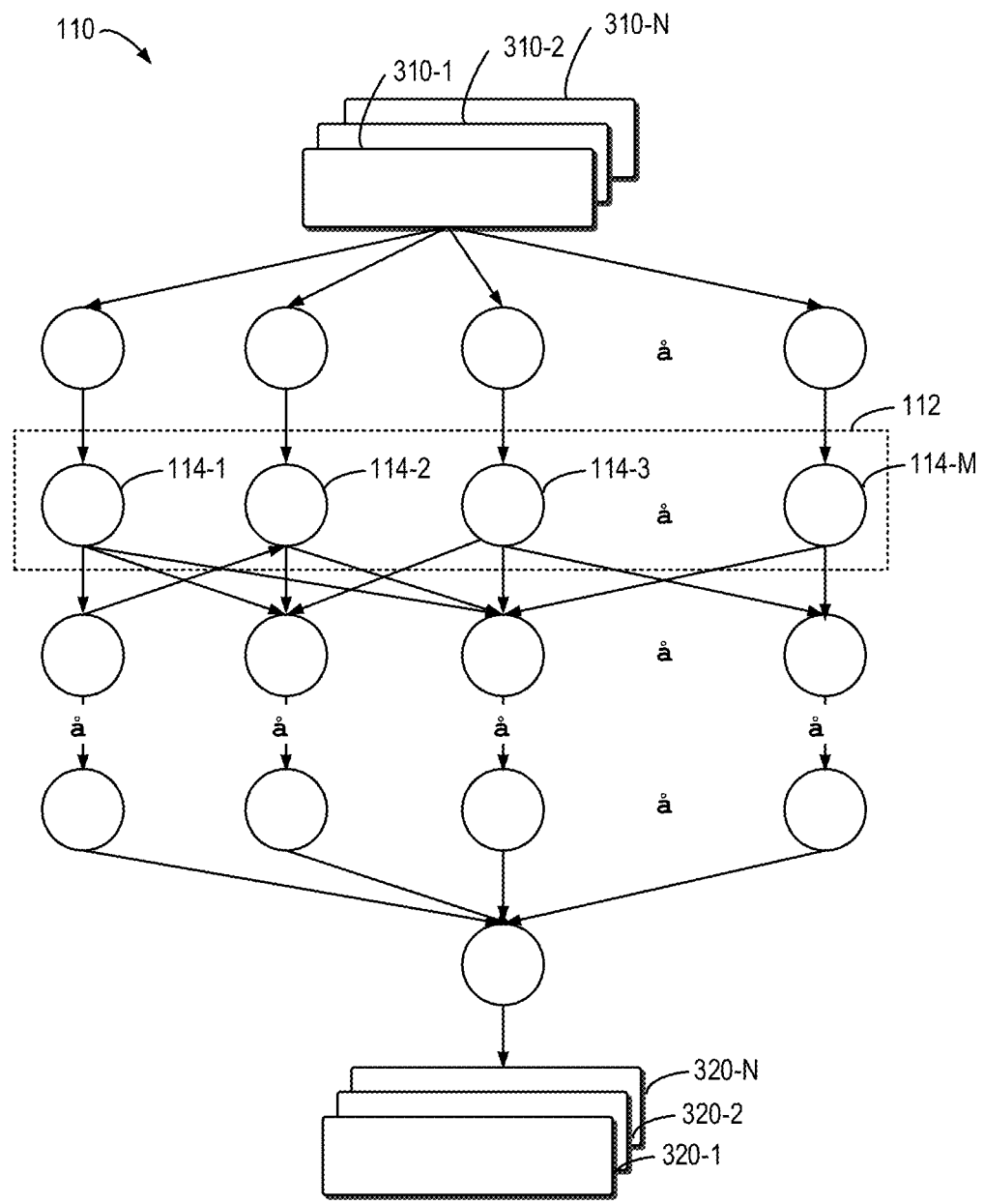
FIG. 3 shows a schematic view of an example prediction model according to embodiments of the present disclosure.

FIG. 3 shows a schematic view of an example prediction model 110 according to embodiments of the present disclosure. As depicted, the prediction model 110 may receive one or more input data 310-1, 310-2 . . . 310-N (separately or collectively referred to as input data 310). It should be understood that in the prediction stage of the prediction model 110, the input data 310 may be the model input data 120 shown in FIG. 1. In the training stage of the prediction model 110, the input data 310 may be training sample data for training the prediction model 110. The prediction model 110 may generate one or more output data 310-1, 320-2 . . . 320-N (separately or collectively referred to as output data 320) corresponding to the one or more input data 310-1, 310-2 . . . 310-N respectively.

As shown in FIG. 3, the prediction model 110 comprises a processing layer 112, wherein the processing layer 112 comprises one or more processing units 114-1, 114-2, 114-3 . . . 114-M (separately or collectively referred to as processing unit 114). In some embodiments, the processing layer 112 may be a convolutional layer or a fully connection layer of a convolutional neural network. Usually, once the training of the prediction model 110 is completed, a parameter (also referred to as weight) of each processing unit 114 in the prediction model 110 is fixed. However, as discussed above, such parameter setting cannot accurately reflect the uncertainty of the model. According to the solution of the present disclosure, the parameter of each processing unit 114 will be trained to satisfy an object parameter distribution, rather than a definite value. In this way, randomness is introduced to the prediction model 110, so that the prediction model 110 can reflect the uncertainty of the prediction 140 more accurately. It should be understood that processing units in different processing layers in the prediction model 110 may have different parameter distributions.

In some embodiments, the computing device 130 may further obtain an object parameter distribution of a processing layer 120 of the prediction model 110. In some embodiments, the computing device 130 may receive a trained object parameter distribution from a further neural network. As an alternative embodiment, the computing device 130 may obtain from a memory a trained object parameter distribution which is stored in the memory. In other alternative embodiments, the computing device 130 may also obtain the object parameter distribution by training the prediction model 110.

The process of a method 400 for obtaining an object parameter distribution by training the prediction model according to embodiments of the present disclosure will be described in conjunction with FIG. 4. It should be understood that the method 400 may be implemented by the computing device 130 in FIG. 1 or other computing device. For the sake of description, the method 400 will be described as being implemented by the computing device 130 for example.

Figure 4:
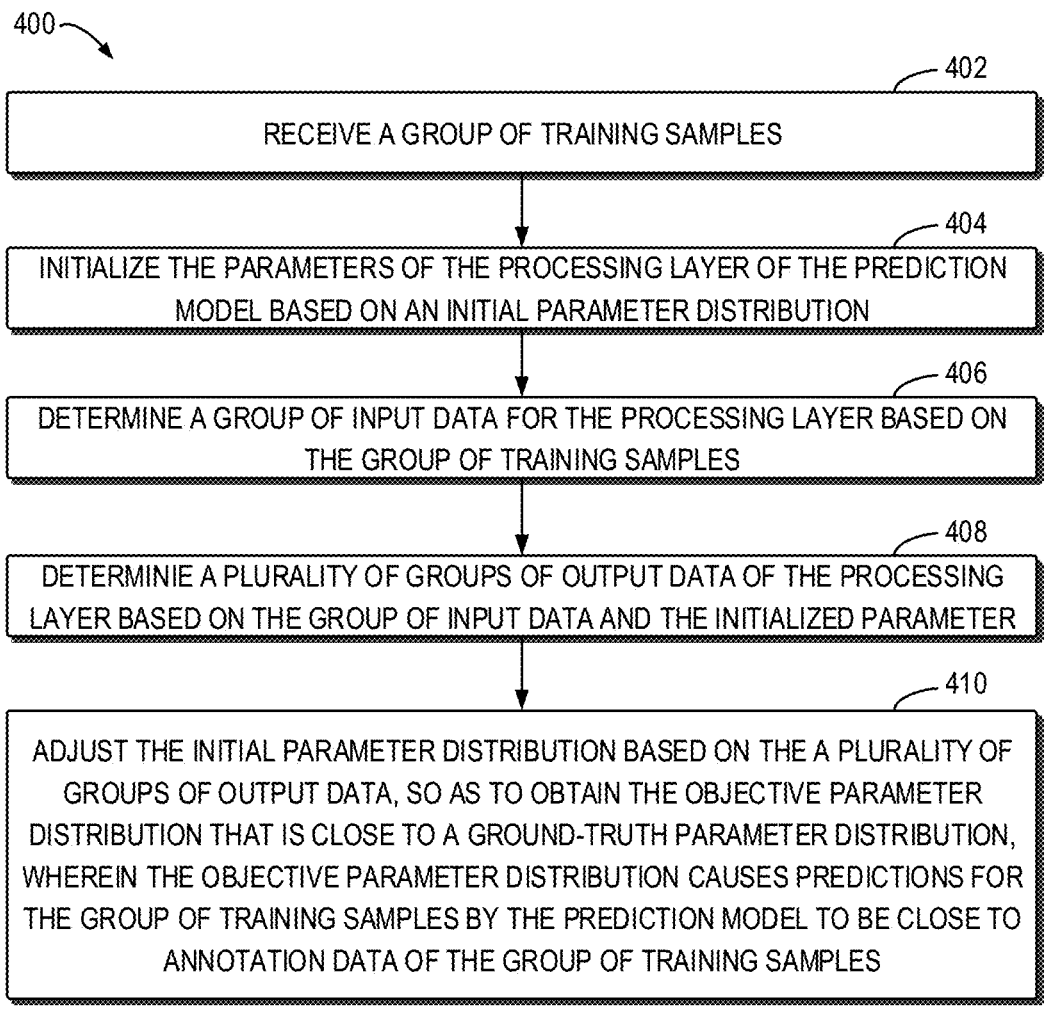
FIG. 4 shows a schematic view of the process of obtaining model parameters according to embodiments of the present disclosure.

As shown in FIG. 4, at block 402, the computing device 130 receives a group of training samples 310. In some embodiments, the group of training samples 310 may also be referred to a batch of samples of size N, which may be input into the prediction model 110 at one time.

At block 404, the computing device 130 initializes a parameter of the processing layer 112 of the prediction model based on an initial parameter distribution. In some embodiments, to accelerate the training of the prediction model 110, the computing device 130 may cause the parameters of each processing unit 113 in the processing layer 112 to satisfy the same distribution. For example, each processing unit 114 may be supposed to satisfy a normal distribution with a mean $\mu$ and a standard deviation $\alpha\mu^2$, wherein $\alpha$ and $\mu$ are to-be-trained object parameter distributions. In some embodiments, different initial parameter distributions may be specified for different processing layers in the prediction model 110.

At block 406, the computing device 130 determines a group of input data for the processing layer 112 based on the group of training samples. In some embodiments, as described above, the processing layer 120 may be a convolutional layer, a fully connection layer and/or other appropriate layer in a convolutional neural network. The prediction model 110 may process the group of training samples 310 based on conventional neural network operations, so as to determine the group of input data for the processing layer 112. For example, the group of input data corresponding to the group of training samples 310 may be denoted as $x_i$, wherein i is between 1 and N. In some embodiments, the computing device 130 may determine a standardized representation $\hat{x}$ of the group of input data $x_i$:

$$\hat{x} = (x_i - \bar{x})/x_{std} \quad (1)$$

Wherein $\bar{x}$ and $x_{std}$ may be determined based on the following equations:

$$\bar{x} = \frac{1}{N} \sum_{i=1}^{N} x_i \quad (2)$$

$$x_{std} = \sqrt{\frac{1}{N} \sum_{i=1}^{N} (x_i - \bar{x})^2} \quad (3)$$

In order to introduce randomness to the prediction model, the computing device 130 may scramble the input data. In some embodiments, the computing device 130 may scramble the standardized input data $\bar{x}$ after standardizing the input, so as to enhance the randomness of the prediction model 110. For example, a random disturbance $\varphi$ that satisfies a Gaussian distribution with a mean 0 and a variance 1 may be added to $\bar{x}$:

$$\hat{x} = \hat{x} + \varphi \quad (4)$$

In some embodiments, the computing device 130 may further scramble the input data $x_i$ before the standardization operation, so as to enhance the randomness of the prediction model 110. That is, Equation (2) may be updated as:

$$\bar{x} = \frac{1}{N} \sum_{i=1}^{N} (x_i + \varphi) \quad (5)$$

It should be understood that the above two scrambling approaches are merely illustrative, and any other appropriate scrambling solution may be selected according to needs of the prediction model. Subsequently, the computing device 130 may further input the standardized input data $\bar{x}$ into the processing layer 112 for further processing.

At block 408, the computing device 130 determines a plurality of groups of output data of the processing layer based on the group of input data and the initialized parameters. Usually, for the prediction model with batch normalization, an output $\tilde{y}$ of the parameter processing layer 112 may be denoted as:

$$\tilde{y} = \gamma \hat{x} + \beta \quad (6)$$

wherein $\gamma$ and $\beta$ are parameters to be determined through training. In embodiments of the present disclosure, considering that all parameters of the processing layer 112 are supposed to satisfy the normal distribution with a mean μ and a standard deviation αμ², γ and β may be denoted as:

$$\beta_i = x_i \odot \mu \quad (7)$$

$$\gamma_i = \text{sqrt}(\alpha x_i^2 \odot \mu^2) \quad (8)$$

Likewise, the computing device 130 may perform a convolutional operation on x̂ so as to obtain $\hat{x}_{new}$. Finally, the a plurality of groups of output data $\tilde{y}_i$ of the processing layer 112 may be denoted as:

$$\tilde{y}_i = \gamma_i \hat{x}_{new} + \beta_i \quad (9)$$

In some embodiments, in consideration of the uncertainty of the prediction model due to changes in the input distribution, the computing device may sample $\tilde{y}_i$ and take it as an input of the following layer of the prediction model through an activation function.

At block 410, the computing device 130 adjusts the initial parameter distribution based on the a plurality of groups of output data, so as to obtain the object parameter distribution that is close to a ground-truth parameter distribution, wherein the object parameter distribution causes predictions for the group of training samples by the prediction model to be close to annotation data of the group of training samples. Specifically, the annotation data represents ground-truth values which the prediction corresponding to the group of training samples is supposed to have.

In some embodiments, usually, in order to introduce randomness to the prediction model 110, when estimating the parameter of the prediction model 110 by using Bayesian inference, the objective function of the prediction model 110 may be set as:

$$L_\alpha(q) = KL[q(\theta|X,Y)\|p_0(\theta)] - \frac{1}{\alpha}\sum_n \log E_q(p_n(y_n|x_n,\theta))^\alpha \quad (10)$$

wherein θ denotes the parameter of the prediction model, α is a hyper-parameter, n is the number of samples, X denotes an input sample set, Y denotes an annotation set corresponding to the sample set X, $x_n$ denotes the n-th input sample, $y_n$ denotes an annotation corresponding to $x_n$, q(θ|X,Y) denotes a posterior distribution obtained based on Bayesian inference, p(θ|X,Y) denotes a true posterior distribution, and $p_0(\theta)$ denotes a prior distribution of parameters, e.g., a specific normal distribution specified by the user. KL[q(θ|X,Y)||$p_0(\theta)$] denotes a divergence between q(θ|X,Y) and $p_0(\theta)$, and $E_q(p_n(y_n|x_n,\theta))^\alpha$ denotes an energy function. Based on the objective function (10), the training objective of the prediction model 110 is to cause the parameter posterior distribution based on Bayesian inference to be close to the known parameter prior distribution as much as possible, and to cause the prediction result obtained based on the group of parameters θ to be close to the annotation data as much as possible.

In some embodiments, the energy function in Equation (10) may be calculated using Monte Carlo sampling:

$$E_q(p_n(y_n|x_n,\theta)^\alpha) = \frac{1}{K}\sum_{i=1}^{K} p_n(y_n|x_n,\theta_i)^\alpha \quad (11)$$

wherein K denotes the number of Monte Carlo sampling occurrences. Usually, the weights of each processing unit 114 of the processing layer 112 need to be sampled. Thus, the computing device 130 needs to perform sampling $K^L$ times, wherein L denotes the number of processing layers of the prediction model. However, such a calculation method will cause a huge calculation load, and especially for a deep neural network with more layers, this calculation method causes the prediction model difficult to converge quickly and effectively.

In some embodiments, the computing device 130 may only sample the output (i.e., Equation (9)) of the processing layer 112 K times, and determine the energy function by using the sample mean. That is, in the embodiments of the present disclosure, the objective function (8) may further be determined as:

$$L_\alpha(q) = KL[q(\theta|X,Y)\|p_0(\theta)] - \frac{1}{\alpha}\sum_n \log E_q p_n(y_n|x_n,\overline{\theta})^\alpha \quad (12)$$

wherein $\overline{\theta}$ denotes the parameter mean determined through K times of sampling.

In this way, where it is assumed that processing units at each layer have the same parameter distribution, regarding the prediction model 110 with L hidden layers, the objective function (12) only needs to perform sampling K*L times, thereby greatly reducing sampling occurrences and the calculation load for solving the objective function and accelerating the convergence of the training of the prediction model 110. Such an objective function (12) can particularly increase the training speed of a network model with more layers or larger parameter space.

In some embodiments, after the objective function (12) is determined, the computing device 130 may perform back-propagation based on the objective function (12) so as to adjust the parameter distribution of each processing layer in the prediction model 110 and cause the training of the prediction model 110 to satisfy a convergence condition. In some embodiments, the convergence condition may be that the variation value of the objective function (12) is less than a predetermined threshold. After the prediction model 110 satisfies the convergence condition, the computing device 130 may obtain the objective parameter distribution for each processing layer 120 of the prediction model 110.

Still with reference to FIG. 2, at block 204, the computing device 130 applies the model input data 120 to the prediction model 110 so as to obtain the prediction 140 about the model input data. A process 500 of obtaining the prediction 140 will be described with reference to FIG. 5 below.

Figure 5:
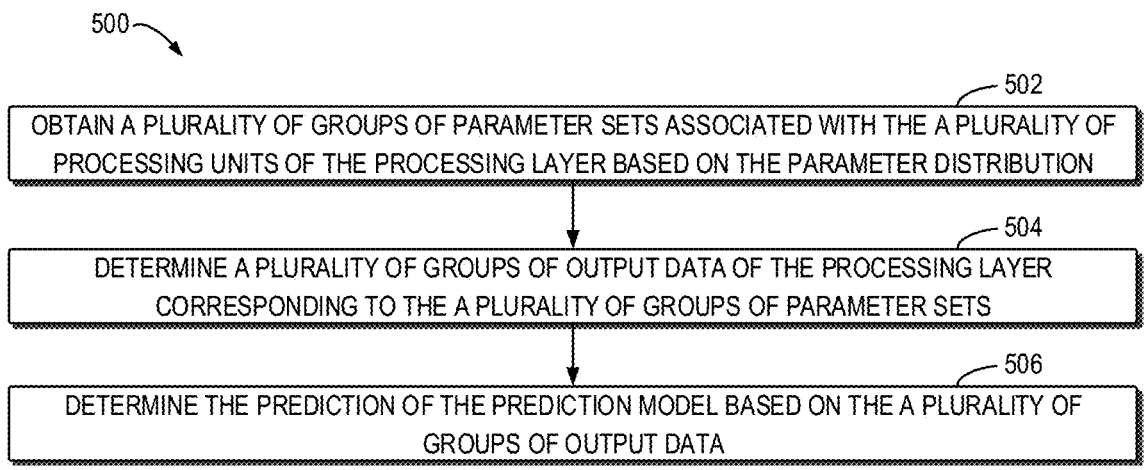
FIG. 5 shows a schematic view of the process of obtaining a prediction according to embodiments of the present disclosure.

As shown in FIG. 5, at block 502, a plurality of groups of parameter sets associated with the a plurality of processing units of the processing layer are obtained based on the parameter distribution. Take the processing layer 112 in the prediction model 110 as an example. As described above, the computing device 130 may obtain the objective parameter distribution which each processing unit 114 in the processing layer 112 satisfies, e.g., a normal distribution with a mean μ and a standard deviation αμ². In the prediction stage of the prediction model 110, the computing device 130 may perform sampling a plurality of times based on the objective parameter distribution, so as to obtain a plurality of groups of parameter sets of each processing unit 114 of the processing layer 112. For example, due to randomness brought about by sampling, although the processing units 114-1 and 114-2 satisfy the same parameter distribution, they may be determined as different parameters in the same sampling. Similarly, the same processing unit 114-1 may also be determined as different parameters in different sampling. In this way, randomness is added to the processing layer 112 of the prediction model 110

At block 504, the computing device 130 determines a plurality of groups of output data corresponding to the a plurality of groups of parameter sets of the processing layer. In some embodiments, the computing device 130 may determine a plurality of groups of outputs corresponding to the a plurality of groups of parameters based on Equation (9). In case of a prediction, the value of $\hat{x}_{new}$ in Equation (9) may be the input x into the processing layer 112 after the model input data 120 is processed.

At block 506, the computing device 130 determines the prediction 140 of the prediction model 110 based on the a plurality of groups of output data. As described above, based on the same parameter passing process as the training process, the computing device 130 may sample the a plurality of groups of output data and take them as an input of the following layer in the deep prediction model 110 through an activation function. Based on such a parameter passing solution, the computing device 130 may determine the prediction 140 of the prediction model 110, e.g., a classification prediction as to whether the input image comprises a cat or a dog. Based on the parameter passing solution according to embodiments of the present disclosure, the prediction model 110 may determine the prediction 140 for the model input data 120 more accurately.

Still with reference to FIG. 2, in some embodiments, the method 200 may further comprise a block 206, in which the computing device 130 determines an uncertainty measurement 150 for the prediction 140 at least based on the objective parameter distribution. In some embodiments, the computing device 130 may calculate a BALD measurement for the prediction 140 as the uncertainty measurement, wherein BALD may be calculated based on an equation below:

$$U=\max(H(Y|X,D)-E_{\theta \sim p(\theta|D)}(H(Y|X,\theta))) \quad (13)$$

wherein H denotes information entropy, D denotes a training dataset, X denotes an input sample set, Y denotes a prediction dataset corresponding to the sample set, and θ denotes the parameter of the prediction model 110. For a more detailed introduction to the BALD measurement, reference may be made to "Bayesian Active Learning for classification and preference learning" by Neil Houlsby, Ferenc Huszár, Zoubin Ghahramani and Máté Lengyel, which is not detailed here. It should be understood that the larger the value of the BALD measurement, the higher the uncertainty of the prediction 140 as made the prediction model 110.

In some embodiments, the computing device 130 may also use a conventional softmax score or information entropy as the uncertainty measurement 150 in the present disclosure. In some embodiments, the computing device 130 may further provide an indication about the uncertainty measurement 150, for example, displaying a specific value of the uncertainty measurement 150 to the user or informing the user of a relative high uncertainty of the prediction, so as to cause the user to pay attention to the model input data 120.

In some embodiments, the computing device 130 may further determine whether the uncertainty measurement 150 is within a predetermined abnormal range or not. When the uncertainty measurement 150 is within the predetermined abnormal range, the computing device 130 may further cause the model input data 120 to be annotated. For example, the predetermined abnormal range is set as the BALD measurement being larger than a specific value. For example, when the BALD measurement of the classification result given by the prediction model 110 is larger than the specific value, it indicates a relative high uncertainty degree of the prediction 140. Or the predetermined abnormal range may be set as the softmax confidence score being less than a specific value. When the resulting softmax confidence score is less than the specific value, it indicates a relative high uncertainty degree of the prediction 140. In some embodiments, for example, the computing device 130 may annotate the model input data 120 by means such as expert annotations, so as to obtain annotation data of the model input data 120. Subsequently, the computing device 130 may further train the prediction model with the annotated model input data. Since the prediction of the prediction model 110 about the model input data 120 is highly uncertain, by training the prediction model 110 with the model input data 120 annotated by an expert model, the accuracy of the prediction of the prediction model 110 about the model input data 120 may be increased, and further the quality of the prediction model 110 may be improved.

In addition, it is found through testing that as compared with the softmax confidence score or information entropy, the BALD measurement can reflect the uncertainty of the prediction 140 made by the prediction model 110 more accurately. Specifically, FIG. 6 shows a graph of the comparison between the solution based on the present disclosure and traditional parameter point estimation.

Figure 6:
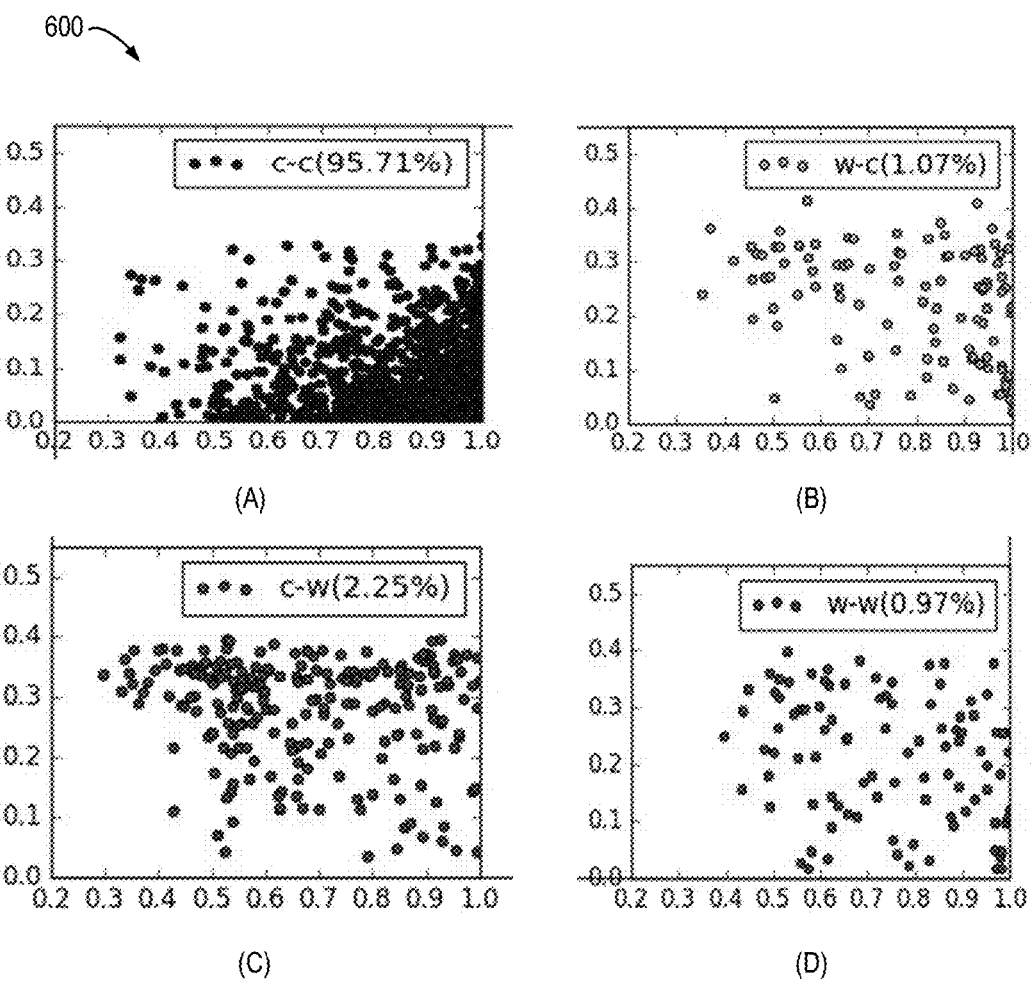
FIG. 6 shows a comparison graph between the solution according to embodiments of the present disclosure and the traditional solution.

FIG. 6 shows a graph of the comparison of applying the solution of the present disclosure and the traditional parameter point estimation solution to 10000 test samples, wherein the x-axis represent softmax confidence scores of different test samples, and the y-axis represents BALD measurements of different test samples. Specifically, FIG. 6(A) is a comparison graph where both the solution of the present disclosure and the traditional solution make a correct prediction; FIG. 6(B) is a comparison graph where the solution of the present disclosure makes a wrong prediction while the traditional solution makes a correct prediction; FIG. 6(C) is a comparison graph where the solution of the present disclosure makes a correct prediction while the traditional solution makes a wrong prediction; and FIG. 6(D) is a comparison graph where both the solution of the present disclosure and the traditional solution make a wrong prediction. As seen from FIG. 6, the prediction accuracy of the solution of the present disclosure is 97.96%, which is higher than that (96.68%) of the traditional parameter point estimation solution. In addition, by comparing the BALD measurement with the softmax confidence score, it can be seen from FIG. 6(C) that samples are more concentrated in an area with higher BALD measurement values, and the BALD measurement can better distinguish between samples which are correctly predicted using the solution of the present disclosure but wrongly predicted using the traditional solution.

In this way, the solution of the present disclosure not only solves the drawbacks that traditional Bayesian inference is difficult to quickly converge in high-dimensional parameter space and the computation overhead is huge, but also introduces randomness to the prediction model. Therefore, the solution of the present disclosure can determine the prediction for the model input data more accurately, obtain the uncertainty measurement that reflects the prediction uncertainty more precisely, and can further filter out input data which the prediction model can hardly accurately predict.

Figure 7:
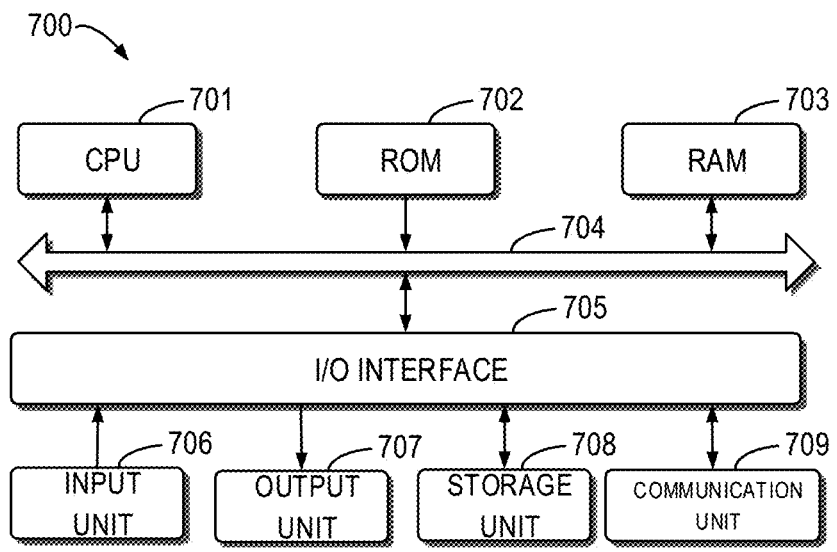
FIG. 7 shows a schematic block diagram of an example device which is applicable to implement embodiments of the present disclosure.

FIG. 7 shows a schematic block diagram of an example device 700 suitable for implementing implementations of the present disclosure. For example, the computing device 130 as shown in FIG. 1 may be implemented by the device 700. As depicted, the device 700 comprises a central processing unit (CPU) 701 which is capable of performing various appropriate actions and processes in accordance with computer program instructions stored in a read only memory (ROM) 702 or computer program instructions loaded from a storage unit 708 to a random access memory (RAM) 703. In the RAM 703, there are also stored various programs and data required by the device 700 when operating. The CPU 701, the ROM 702 and the RAM 703 are connected to one another via a bus 704. An input/output (I/O) interface 705 is also connected to the bus 704.

A plurality of components in the device 700 are connected to the I/O interface 705: an input unit 706 including a keyboard, a mouse, or the like; an output unit 707, such as various types of displays, a loudspeaker or the like; a storage unit 708, such as a disk, an optical disk or the like; and a communication unit 709, such as a LAN card, a modem, a wireless communication transceiver or the like. The communication unit 709 allows the device 700 to exchange information/data with other device via a computer network, such as the Internet, and/or various telecommunication networks.

The above-described procedures and processes, e.g., the method 200, 400 and/or 500 may be executed by the processing unit 701. For example, in some implementations, the method 200, 400 and/or 500 may be implemented as a computer software program, which is tangibly embodied on a machine readable medium, e.g. the storage unit 708. In some implementations, part or the entirety of the computer program may be loaded to and/or installed on the device 700 via the ROM 702 and/or the communication unit 709. The computer program, when loaded to the RAM 703 and executed by the CPU 701, may execute one or more acts of the method 200, 400 and/or 500 as described above.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the present disclosure have been presented for purposes of illustration, but are not intended to be exhaustive or limited to implementations disclosed. Many modifications and variations will be apparent to those of ordinary skill in the art without departing from the scope and spirit of the described implementations. The terminology used herein was chosen to best explain the principles of implementations, the practical application or technical improvement over technologies found in the marketplace, or to enable others of ordinary skill in the art to understand implementations disclosed herein.

We claim:

1. A method for data analysis, comprising:
obtaining a prediction model, a processing layer of the prediction model comprising a plurality of processing units, parameters of each of the plurality of processing units satisfying an objective parameter distribution, an output of the prediction model being determined based on a plurality of groups of parameters determined from the objective parameter distribution;
obtaining the objective parameter distribution for the processing layer of the prediction model;
initializing the parameters of the processing layer of the prediction model based on an initial parameter distribution;
determining a group of input data for the processing layer based on a group of training samples;
determining a plurality of groups of output data of the processing layer based on the group of input data and the initialized parameter;
adjusting the initial parameter distribution based on the plurality of groups of output data, so as to obtain the objective parameter distribution that is close to a ground-truth parameter distribution, wherein the objective parameter distribution causes predictions for the group of training samples by the prediction model to be close to annotation data of the group of training samples, wherein the objective parameter distribution indicates a value range of the parameters, and wherein the annotation data comprises ground-truth values corresponding to the group of training samples;
applying model input data to the prediction model, so as to obtain a prediction for the model input data;
determining an uncertainty measurement of the prediction at least based on the objective parameter distribution, wherein the uncertainty measurement comprises a SOFTMAX confidence score and a Bayesian Active Learning by Disagreement (BALD) measurement; and
generating a comparison between the SOFTMAX confidence score and the BALD measurement.

2. The method according to claim 1, wherein obtaining the prediction comprises:
obtaining a plurality of groups of parameter sets associated with the plurality of processing units of the processing layer based on the parameter distribution;
determining the plurality of groups of output data of the processing layer corresponding to the plurality of groups of parameter sets; and
determining the prediction of the prediction model based on the plurality of groups of output data.

3. The method according to claim 1, wherein the prediction model is based on a convolutional neural network, and the processing layer comprises at least one of a convolutional layer and a fully connection layer of the convolutional neural network.

4. The method according to claim 1, wherein the model input data is non-time series data.

5. The method according to claim 1, further comprising:
providing an indication about the uncertainty measurement.

6. The method according to claim 1, further comprising:
in response to the uncertainty measurement being within a predetermined abnormal range, causing the model input data to be annotated; and
training the prediction model with the annotated model input data.

7. The method according to claim 1, wherein the uncertainty measurement comprises an information entropy.

8. A device for data analysis, comprising:
at least one processing unit; and
at least one memory, coupled to the at least one processing unit and storing instructions executed by the at least one processing unit, the instructions, when executed by the at least one processing unit, causing the device to perform acts comprising:
obtaining a prediction model, a processing layer of the prediction model comprising a plurality of processing units, parameters of each of the plurality of processing units satisfying an objective parameter distribution, an output of the prediction model being determined based on a plurality of groups of parameters determined from the objective parameter distribution;
obtaining the objective parameter distribution for the processing layer of the prediction model;
initializing the parameters of the processing layer of the prediction model based on an initial parameter distribution;
determining a group of input data for the processing layer based on a group of training samples;

determining a plurality of groups of output data of the processing layer based on the group of input data and the initialized parameter;

adjusting the initial parameter distribution based on the plurality of groups of output data, so as to obtain the objective parameter distribution that is close to a ground-truth parameter distribution, wherein the objective parameter distribution causes predictions for the group of training samples by the prediction model to be close to annotation data of the group of training samples, wherein the objective parameter distribution indicates a value range of the parameters, and wherein the annotation data comprises ground-truth values corresponding to the group of training samples;

applying model input data to the prediction model, so as to obtain a prediction for the model input data;

determining an uncertainty measurement of the prediction at least based on the objective parameter distribution, wherein the uncertainty measurement comprises a SOFTMAX confidence score and a Bayesian Active Learning by Disagreement (BALD) measurement; and generating a comparison between the SOFTMAX confidence score and the BALD measurement.

9. The device according to claim 8, wherein obtaining the prediction comprises:

obtaining a plurality of groups of parameter sets associated with the plurality of processing units of the processing layer based on the parameter distribution;

determining the plurality of groups of output data of the processing layer corresponding to the plurality of groups of parameter sets; and determining the prediction of the prediction model based on the plurality of groups of output data.

10. The device according to claim 8, wherein the prediction model is based on a convolutional neural network, and the processing layer comprises at least one of a convolutional layer and a fully connection layer of the convolutional neural network.

11. The device according to claim 8, wherein the model input data is non-time series data.

12. The device according to claim 8, the acts further comprising:

providing an indication about the uncertainty measurement.

13. The device according to claim 8, the acts further comprising:

in response to the uncertainty measurement being within a predetermined abnormal range, causing the model input data to be annotated; and training the prediction model with the annotated model input data.

14. A computer-readable storage medium having computer-readable program instructions stored thereon for performing a method according to claim 1.

* * * * *